(12) United States Patent
Rho et al.

(10) Patent No.: US 8,817,207 B2
(45) Date of Patent: Aug. 26, 2014

(54) LIQUID CRYSTAL DISPLAY WITH UV OR BLUE LIGHT BLOCKING FILTER

(75) Inventors: Soon-Joon Rho, Suwon-si (KR);
Hyeok-Jin Lee, Seongnam-si (KR);
Hee-Keun Lee, Suwon-si (KR);
Baek-Kyun Jeon, Yongin-si (KR)

(73) Assignee: Samsung Display Co., Ltd. (KR)

( * ) Notice: Subject to any disclaimer, the term of this patent is extended or adjusted under 35 U.S.C. 154(b) by 934 days.

(21) Appl. No.: 12/416,480

(22) Filed: Apr. 1, 2009

(65) Prior Publication Data

US 2010/0091219 A1    Apr. 15, 2010

(30) Foreign Application Priority Data

Oct. 13, 2008   (KR) .................. 10-2008-0100139

(51) Int. Cl.
*G02F 1/1335* (2006.01)
*G02F 1/1333* (2006.01)

(52) U.S. Cl.
USPC ............................................................ 349/71

(58) Field of Classification Search
USPC ............ 349/69, 71, 62, 70, 74, 75, 76; 345/5, 345/74, 75, 88; 313/503
See application file for complete search history.

(56) References Cited

U.S. PATENT DOCUMENTS

| | | | |
|---|---|---|---|
| 4,126,384 A | 11/1978 | Goodman et al. | |
| 5,926,239 A | 7/1999 | Kumar et al. | |
| 6,465,092 B1 * | 10/2002 | Takushima et al. | 428/355 R |
| 6,700,555 B1 * | 3/2004 | Jones | 345/76 |
| 2001/0019240 A1 * | 9/2001 | Takahashi | 313/483 |
| 2006/0244367 A1 * | 11/2006 | Im et al. | 313/503 |
| 2008/0074583 A1 | 3/2008 | Li et al. | |

FOREIGN PATENT DOCUMENTS

| | | |
|---|---|---|
| JP | 2004101614 | 4/2004 |
| JP | 2005274674 | 10/2005 |
| JP | 2006330488 | 12/2006 |
| JP | 2007025621 | 2/2007 |
| KR | 19960005151 | 2/1996 |
| KR | 1019990075731 | 10/1999 |
| KR | 1020000013514 | 3/2000 |
| KR | 1020050086982 | 8/2005 |
| KR | 1020070070052 | 7/2007 |
| KR | 1020080032313 | 4/2008 |

* cited by examiner

*Primary Examiner* — Akm Enayet Ullah
(74) *Attorney, Agent, or Firm* — Cantor Colburn LLP (57) ABSTRACT

A liquid crystal display including a first substrate; a light-blocking member disposed on the first substrate; an emission layer disposed on the first substrate; an ultraviolet-light blocking filter disposed on the emission layer; a lower polarizer disposed on the ultraviolet-light blocking filter; a gate line and a data line disposed on the lower polarizer and substantially perpendicular to each other; a thin film transistor electrically connected to the gate line and the data line; a pixel electrode electrically connected to the thin film transistor; a second substrate disposed facing the first substrate; a common electrode disposed on the second substrate; and a liquid crystal layer interposed between the first substrate and the second substrate.

26 Claims, 5 Drawing Sheets

LIQUID CRYSTAL DISPLAY WITH UV OR BLUE LIGHT BLOCKING FILTER

This application claims priority to Korean Patent Application No. 10-2008-0100139, filed on Oct. 13, 2008, and all the benefits accruing therefrom under 35 U.S.C. §119, the contents of which in its entirety are herein incorporated by reference.

BACKGROUND OF THE INVENTION (a) Field of the Invention

This disclosure relates to a liquid crystal display.

(b) Description of the Related Art

A liquid crystal display ("LCD") is a type of flat panel display. An LCD includes two substrates with electrodes disposed thereon and a liquid crystal layer interposed between the two substrates. In the LCD, a voltage is applied to the electrodes to realign liquid crystal molecules of the liquid crystal layer to thereby regulate transmittance of light passing through the liquid crystal layer.

A type of LCD is an LCD wherein field-generating electrodes are respectively disposed on two display panels. The two display panels can include a thin film transistor array panel and a common electrode panel. The thin film transistor array panel can include a plurality of pixel electrodes and thin film transistors disposed in a matrix format. The common electrode panel can include red, green and blue color filters disposed thereon, and a common electrode can cover an entire surface of the common electrode panel.

The color filters can have low light efficiency and the liquid crystal display can have a narrow viewing angle such that the color filter is desirably replaced with a phosphor having high efficiency. Accordingly, a self-emission liquid crystal display, having a wide viewing angle and including a Lambertian surface, which follows Lambert's emission law, is desirable.

A self-emission liquid crystal display can use an ultraviolet backlight to provide high light efficiency, however, while not wanting to be bound by theory, it is believed that ultraviolet ("UV") light can cause degradation of a liquid crystal display cell.

BRIEF SUMMARY OF THE INVENTION

The disclosed liquid crystal display improves efficiency and reduces or substantially prevents cross talk in a self-emission liquid crystal display.

The above described and other drawbacks are alleviated by a liquid crystal display including a first substrate; a light-blocking member disposed on the first substrate; an emission layer disposed on the first substrate; an ultraviolet-light blocking filter disposed on the emission layer; a lower polarizer disposed on the ultraviolet-light blocking filter; a gate line and a data line disposed on the lower polarizer and substantially perpendicular to each other; a thin film transistor electrically connected to the gate line and the data line; a pixel electrode electrically connected to the thin film transistor; a second substrate disposed facing the first substrate; a common electrode disposed on the second substrate; and a liquid crystal layer interposed between the first substrate and the second substrate.

The liquid crystal display may further include a backlight assembly supplying light to the first substrate and the second substrate, the backlight assembly including an ultraviolet light emitting diode ("LED").

The emission layer may include a red emission layer, a green emission layer, and a blue emission layer, the red emission layer may include at least one of $Y_2O_2S$, $La_2O_2S$, $(Ca, Sr, Ba)_2Si_5N_8$, $CaAlSiN_3$, $(La, Eu)_2W_3O_{12}$, $(Ca, Sr, Ba)_3MgSi_2O_8$, and $Li(Eu, Sm)W_2O_8$, the green emission layer may include at least one of $(Ca, Sr, Ba)_2SiO_4$, BAM, α-SiAlON, $Ca_3Sc_2Si_3O_{12}$, $Tb_3\beta l_5O_{12}$ and $LiTbW_2O_8$, and the blue emission layer may include at least one of $BaMgAl_{10}O_{17}$, $(Mg, Ca, Sr, Ba)_5PO_{43}Cl$, $EuSi_9Al_{19}ON_{31}$ and $La_{1-x}Ce_xAl(Si_{6-z}Al_z)(N_{10-z}O_z)$.

The ultraviolet-light blocking filter may include at least one of $BiO_2$, ZnO and $Ce_2O_3$, and at least one of $CaCO_3$, $ZrO_2$, TiO and $Ar_2O_3$.

The thickness of the ultraviolet-light blocking filter may be between about 5 micrometers ("μm") to about 20 μm.

The emission layer may include a red emission layer, a green emission layer and a blue emission layer, and the red emission layer, the green emission layer and the blue emission layer may include quantum dots.

The liquid crystal layer may be disposed between the lower polarizer and the second substrate.

The liquid crystal display may further include an upper polarizer disposed on a rear surface of the second substrate.

Also disclosed is a liquid crystal display including a first substrate; a gate line and a data line disposed on the first substrate and substantially perpendicular to each other; a thin film transistor electrically connected to the gate line and the data line; a pixel electrode electrically connected to the thin film transistor; a second substrate disposed facing the first substrate; a blue-light blocking filter and a transparent polymer disposed on a surface of the second substrate and facing the first substrate; a light-blocking member disposed under the blue-light blocking filter and the transparent polymer; an emission layer disposed under the blue-light blocking filter and the transparent polymer; an upper polarizer disposed under the emission layer; a common electrode disposed under the upper polarizer; and a liquid crystal layer interposed between the first substrate and the second substrate.

The liquid crystal display may further include a backlight assembly supplying light to the first substrate and the second substrate, the backlight assembly including a blue LED.

The emission layer may include a red emission layer, a green emission layer and a blue emission layer, the red emission layer may include at least one of $(Ca, Sr, Ba)S$, $(Ca, Sr, Ba)_2Si_5N_8$, $CaAlSiN_3$, $CaMoO_4$ and $Eu_2Si_5N_8$, the green emission layer may include at least one of yttrium aluminum garnet ("YAG"), $(Ca, Sr, Ba)_2SiO_4$, $SrGa_2S_4$, BAM, α-SiA-lON, β-SiAlON, $Ca_3Sc_2Si_3O_{12}$, $Tb_3Al_5O_{12}$, $BaSiO_4$, CaAl-SiON and $(Sr_{1-x}Ba_x)Si_2O_2N_2$, and the blue emission layer may include at least one of $BaMgAl_{10}O_{17}$, $BaMg_2Al_{16}O_{27}$, $Sr_{10}PO_{46}C_{12}$ and $(BaSrCa)_{10}PO_{46}C_{12}$.

The blue-light blocking filter may be disposed in a red pixel and a green pixel, and include at least one of $BiO_2$, ZnO and $Ce_2O_3$ and at least one of $CaCO_3$, $ZrO_2$, TiO and $Ar_2O_3$.

The thickness of the blue-light blocking filter may be between about 23 μm to about 50 μm.

The transparent polymer may be disposed in a blue pixel.

The emission layer may include a red emission layer, a green emission layer and a blue emission layer, and the red emission layer, the green emission layer and the blue emission layer may include quantum dots.

The liquid crystal layer may be disposed between the first substrate and the upper polarizer.

The liquid crystal display may further include a lower polarizer disposed on a rear surface of the first substrate.

Also disclosed is a method displaying an image, the method including illuminating an emitting layer with ultraviolet light, the emitting layer including a blue phosphor, a red phosphor and a green phosphor to form a blue light, a red light and a green light; blocking transmittance of the ultraviolet light; passing the blue light, the red light and the green light through a first polarizer; passing the blue light, the red light and the green light though a liquid crystal layer; and disposing the blue light, the red light and the green light on a second polarizer.

According to an exemplary embodiment, the red, green and blue phosphors are used to form emission layers such that a light efficiency is improved, and a polarizer is disposed in the liquid crystal display cell, thereby improving a cross talk.

These and other features, aspects, and advantages of the disclosed embodiments will become better understood with reference to the following description and appended claims.

BRIEF DESCRIPTION OF THE DRAWINGS

The disclosed subject matter is particularly pointed out and distinctly claimed in the claims at the conclusion of the specification. The foregoing and other objects, features, and advantages of the disclosed embodiments are apparent from the following detailed description taken in conjunction with the accompanying drawings in which:

The detailed description explains the disclosed embodiments, together with advantages and features, by way of example with reference to the drawings.

DETAILED DESCRIPTION OF THE INVENTION

Aspects, advantages, and features of the present invention and methods of accomplishing the same may be understood more readily by reference to the following detailed description of preferred embodiments and the accompanying drawings. The present invention may, however, may be embodied in many different forms, and should not be construed as being limited to the embodiments set forth herein. Rather, these embodiments are provided so that this disclosure will be thorough and complete and will fully convey the concept of the invention to those skilled in the art, and the present invention will only be defined by the appended claims.

The present invention is described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms first, second, third, etc., may be used herein to describe various elements, components, regions, layers, and/or sections, these elements, components, regions, layers and/or sections should not be limited by these terms. These terms are only used to distinguish one element, component, region, layer, or section from another region, layer or section. Thus, a first element, component, region, layer, or section discussed below could be termed a second element, component, region, layer, or section without departing from the teachings of the present invention.

Spatially relative terms, such as "below", "lower", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "lower" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be described in further detail with reference to the accompanying drawings. However, the aspects, features, and advantages of the present invention are not restricted to the ones set forth herein. The above and other aspects, features and advantages of the present invention will become more apparent to one of ordinary skill in the art to which the present invention pertains by referencing a detailed description of the present invention given below.

A liquid crystal display according to an exemplary embodiment is further described with reference to FIG. 1 to FIG. 3.

Figure 1:
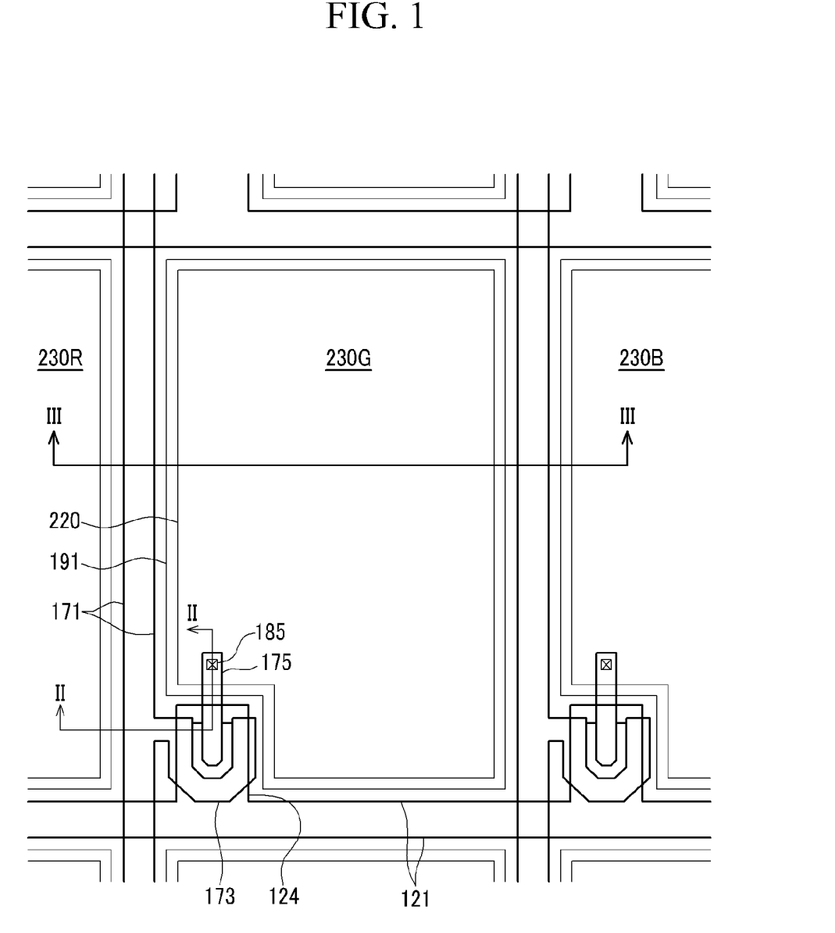
FIG. 1 is a plan view showing an exemplary embodiment of a liquid crystal display.
Figure 2:
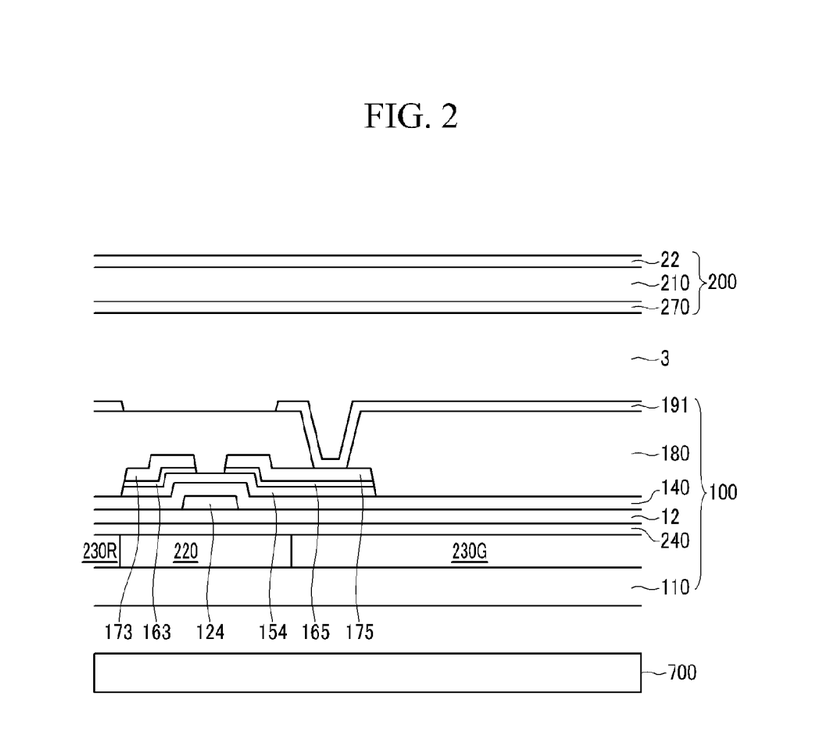
FIG. 2 is a cross-sectional view showing an exemplary embodiment of the liquid crystal display shown in FIG. 1 taken along line II-II.
Figure 3:
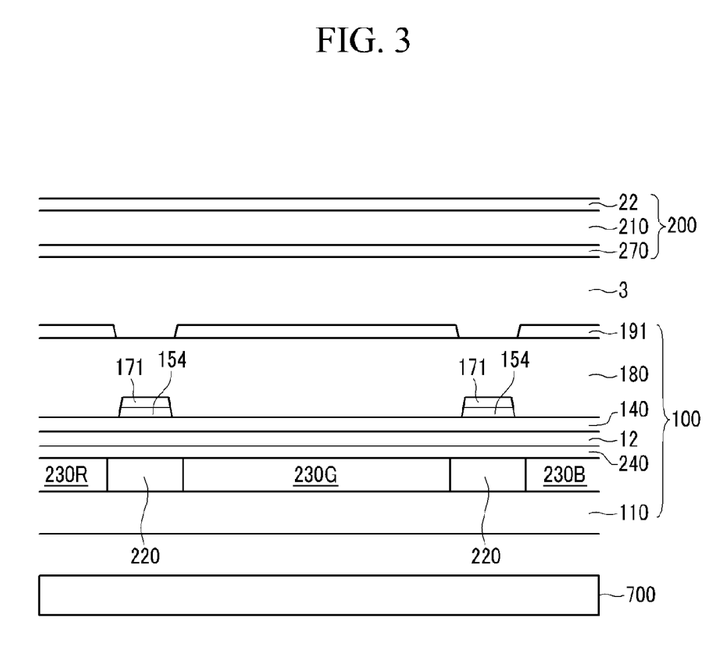
FIG. 3 is a cross-sectional view showing an exemplary embodiment of the liquid crystal display shown in FIG. 1 taken along line III-III.

FIG. 1 is a plan view showing an exemplary embodiment of a liquid crystal display, FIG. 2 is a cross-sectional view showing an exemplary embodiment of the liquid crystal display shown in FIG. 1 taken along line II-II, and FIG. 3 is a cross-sectional view showing an exemplary embodiment of the liquid crystal display shown in FIG. 1 taken along line III-III.

As shown in FIG. 1 to FIG. 3, a liquid crystal display according to an exemplary embodiment includes a thin film transistor array panel 100 and a common electrode panel 200 disposed facing each other, and a liquid crystal layer 3 interposed between the thin film transistor array panel 100 and the common electrode panel 200. Also, the liquid crystal display includes a backlight assembly 700 supplying ultraviolet light to the thin film transistor array panel 100 and the common electrode panel 200. The backlight assembly 700 includes ultraviolet light emitting diodes ("LED"s) that generate ultraviolet light.

Firstly, a thin film transistor array panel 100 is further described.

A plurality of light-blocking members 220, also referred to as a black matrix, are disposed on a substrate 110, which comprises an insulating material such as glass, plastic, or the like, and red, green and blue emission layers 230R, 230G and 230B, respectively, are disposed in regions defined by light-blocking members 220.

The red, green and blue emission layers 230R, 230G and 230B include a red emission layer 230R, a green emission layer 230G, and a blue emission layer 230B respectively emitting red light, green light, and blue light upon excitation by ultraviolet light provided by the backlight assembly 700.

The red emission layer 230R comprises a red phosphor, and the red phosphor comprises at least one of $Y_2O_{25}$, $La_2O_2S$, $(Ca, Sr, Ba)_2Si_5N_8$, $CaAlSiN_3$, $(La, Eu)_2W_3O_{12}$, $(Ca, Sr, Ba)_3MgSi_2O_8$, and $Li(Eu, Sm)W_2O_8$. The red phosphor receives ultraviolet light, and emits and disperses the red light.

The green emission layer 230G is made of a green phosphor, and the green phosphor comprises at least one of $(Ca, Sr, Ba)_2SiO_4$, BAM ($BaMgAl_{10}O_{17}:Eu^{2+}$), α-SiAlON, $Ca_3Sc_2Si_3O_{12}$, $Tb_3Al_5O_{12}$ and $LiTbW_2O_8$. The green phosphor receives ultraviolet light, and emits and disperses the green light.

The blue emission layer 230B is made of a blue phosphor, and the blue phosphor comprises at least one of $BaMgAl_{10}O_{17}$, $(Mg, Ca, Sr, Ba)_5PO_{43}Cl$, $EuSi_9Al_{19}ON_{31}$ and $La_{1-x}Ce_xAl(Si_{6-z}Al_z)(N_{10-z}O_z)$. The blue phosphor receives ultraviolet light, and emits and disperses the blue light.

Also, the red, green and blue emission layers 230R, 230G and 230B may comprise quantum dots, wherein the color of the light emitted by the quantum dots is selected by selecting the size of the quantum dot particles.

An ultraviolet-light blocking filter 240, which blocks ultraviolet light, is disposed on the red, green and blue emission layers 230R, 230G and 230B. The red, green and blue emission layers 230R, 230G and 230B receive the ultraviolet light and respectively emit red, green and blue light, and a portion of the ultraviolet light is supplied upward. The ultraviolet-light blocking filter 240 can substantially or completely block the ultraviolet light supplied upward through the red, green and blue emission layers 230R, 230G and 230B.

The ultraviolet-light blocking filter 240 comprises a mixture of at least one of $BiO_2$, ZnO and $Ce_2O_3$ and at least one of $CaCO_3$, $ZrO_2$, TiO and $Ar_2O_3$, and the thickness thereof is between about 5 μm to about 20 μm.

A lower polarizer 12 is disposed on the ultraviolet-light blocking filter 240.

Therefore, the red, green and blue emission layers 230R, 230G and 230B can comprise the red, green and blue phosphors and a light efficiency can be improved, and the ultraviolet-light blocking filter 240 is disposed to block the ultraviolet light in a liquid crystal display cell such that degradation of the liquid crystal display cell may be reduced or effectively prevented. Also, the lower polarizer 12 can be disposed in the liquid crystal display cell, thereby improving a cross talk.

A plurality of gate lines 121 are disposed on the lower polarizer 12. A gate insulating layer 140, a plurality of semiconductors 154, a plurality of first and second ohmic contacts 163 and 165, respectively, a plurality of data lines 171, and a plurality of drain electrodes 175 are disposed thereon. In an embodiment, the gate insulating layer 140, the semiconductors 154, the plurality of first and second ohmic contacts 163 and 165, respectively, the data lines 171, and the plurality of drain electrodes 175 are disposed sequentially. The gate lines 121 transmit gate signals and extend in a transverse direction. Each of the gate lines 121 includes a plurality of gate electrodes 124 protruding upward.

The data lines 171 transmit data signals and extend in a longitudinal direction, thereby intersecting the gate lines 121. Each data line 171 includes a plurality of source electrodes 173 extending toward the gate electrodes 124. The drain electrodes 175 are separated from the data lines 171 and can be disposed opposite to the source electrodes 173 with respect to the gate electrodes 124.

The semiconductors 154 are disposed on the gate electrodes 124, and the ohmic contacts 163 and 165 thereon are disposed between the semiconductors 154 and the data lines 171 and drain electrodes 175, thereby reducing a contact resistance therebetween. A thin film transistor ("TFT") comprises a gate electrode 124, a source electrode 173, a drain electrode 175, and a semiconductor 154, and a channel of the thin film transistor is disposed in the semiconductor 154 between the source electrode 173 and the drain electrode 175. A passivation layer 180 is disposed on the gate-insulating layer 140, the data lines 171, and the drain electrodes 175. The passivation layer 180 has a contact hole 185 exposing the drain electrode 175.

A pixel electrode 191 is disposed on the passivation layer 180. The pixel electrode 191 may comprise a transparent conductive material, such as indium tin oxide ("ITO"), indium zinc oxide ("IZO"), or the like, or a reflective metal such as aluminum, a silver alloy, or the like, and is electrically connected to the drain electrode 175 through the contact hole 185.

The common electrode panel 200 is disposed facing to the thin film transistor array panel 100, and includes a substrate 210 and a common electrode 270 disposed thereon. An upper polarizer 22 is disposed on a rear surface of the substrate 210. The liquid crystal layer 3 is disposed between the common electrode panel 200 and the thin film transistor array panel 100.

Figure 4:
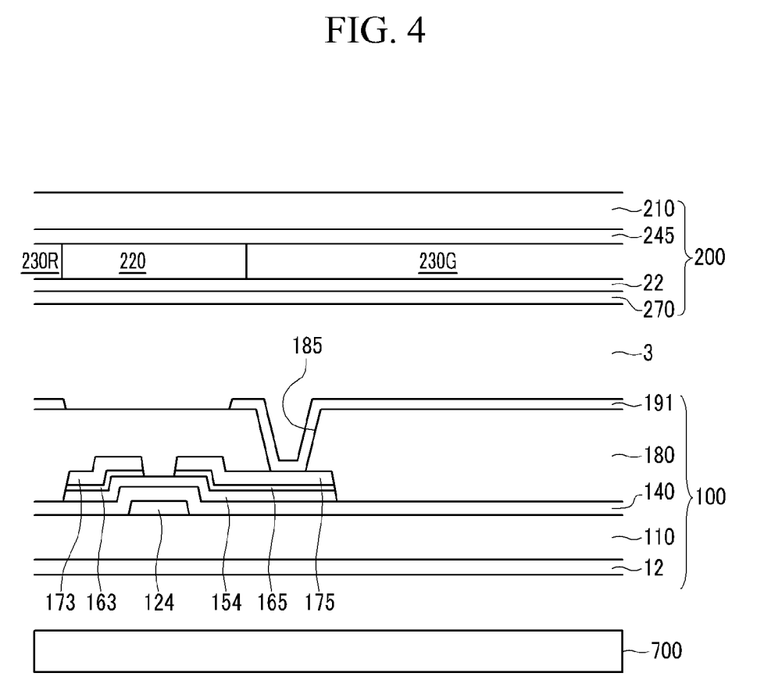
FIGS. 4 and 5 are cross-sectional views showing an exemplary embodiment of a liquid crystal display according to another embodiment.
Figure 5:
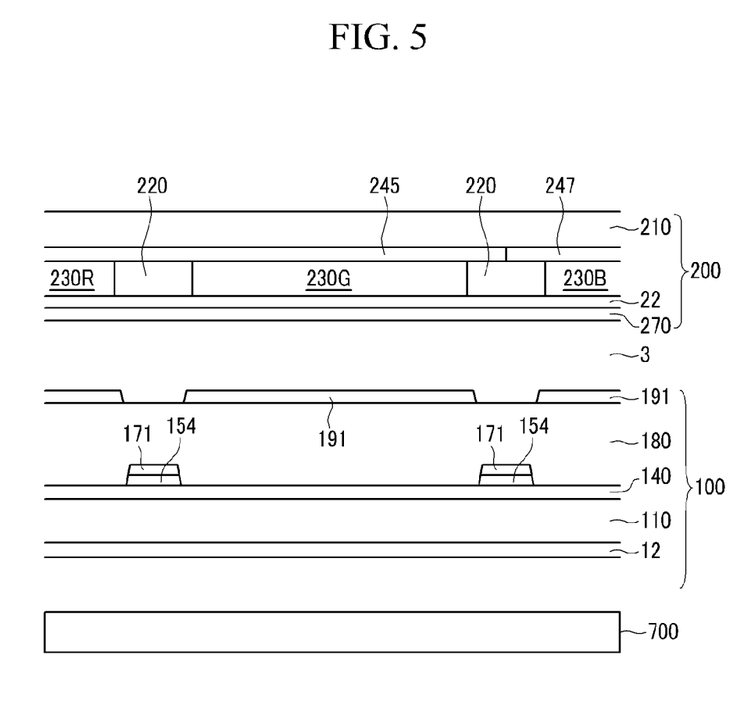

A liquid crystal display according to another exemplary embodiment is further described with reference to FIGS. 4 and 5. FIG. 4 and FIG. 5 are cross-sectional views of a liquid crystal display according to another exemplary embodiment. As shown in FIGS. 4 and 5, a liquid crystal display according to another exemplary embodiment includes a thin film transistor array panel 100, a common electrode panel 200 disposed facing thereto, and a liquid crystal layer 3 interposed between the thin film transistor array panel 100 and the common electrode panel 200. In an exemplary embodiment, the liquid crystal display includes a backlight assembly 700 supplying a blue light to the thin film transistor array panel 100 and the common electrode panel 200, and the backlight assembly 700 includes a blue LED, which generates blue light.

Firstly, the thin film transistor array panel 100 is described.

A plurality of gate lines 121 are disposed on a substrate 110, which comprises an insulating material such as glass, plastic, or the like. A gate insulating layer 140, a plurality of semiconductors 154, a plurality of first and second ohmic contacts 163 and 165, respectively, a plurality of data lines 171, and a plurality of drain electrodes 175 are disposed thereon. In an embodiment, the gate insulating layer 140, the semiconductors 154, the plurality of first and second ohmic contacts 163 and 165, respectively, the data lines 171, and the plurality of drain electrodes 175 are disposed sequentially. The gate lines 121 transmit gate signals and extend in a transverse direction. Each of the gate lines 121 includes a plurality of gate electrodes 124 protruding upward.

The data lines 171 transmit data signals and extend in a longitudinal direction, thereby intersecting the gate lines 121. Each data line 171 includes a plurality of source electrodes 173 extending toward the gate electrodes 124. The drain electrodes 175 are separated from the data lines 171, and are disposed opposite to the source electrodes 173 with respect to the gate electrodes 124.

The semiconductors 154 are disposed on the gate electrodes 124, and the first and second ohmic contacts 163 and 165 thereon are disposed between the semiconductors 154 and the data lines 171 and drain electrodes 175, thereby reducing a contact resistance therebetween.

A TFT comprises a gate electrode 124, a source electrode 173, and a drain electrode 175, and a semiconductor 154, and a channel of the thin film transistor is disposed in the semiconductor 154 between the source electrode 173 and the drain electrode 175. A passivation layer 180 is disposed on the gate-insulating layer 140, the data line 171 and the drain electrode 175. The passivation layer 180 has a contact hole 185 exposing the drain electrode 175.

A pixel electrode 191 is disposed on the passivation layer 180. The pixel electrode 191 may comprise a transparent conductive material such as ITO, IZO, or the like, or a reflective metal such as aluminum, a silver alloy, or the like, and is electrically connected to the drain electrode 175 through the contact hole 185. A lower polarizer 12 is disposed on the rear surface of the first substrate 110.

Next, the common electrode panel 200 is described.

A transparent polymer 247 and a blue-light blocking filter 245 are disposed on a substrate 210, which comprises an insulating material such as glass, plastic, or the like. The blue light-blocking filter 245 is disposed in the red pixel and the green pixel, and the transparent polymer 247 is disposed in the blue pixel. The blue-light blocking filter 245 comprises a mixture of at least one of $BiO_2$, ZnO and $Ce_2O_3$ and at least one of $CaCO_3$, $ZrO_2$, TiO and $Ar_2O_3$, and the thickness thereof is between about 23 μm to about 50 μm.

A plurality of light-blocking members 220 are disposed on the blue-light blocking filter 245 and the transparent polymer 247, and the red, green and blue emission layers 230R, 230G and 230B are respectively disposed in regions defined by the light-blocking members 220. The red, green and blue emission layers 230R, 230G and 230B include a red emission layer 230R, a green emission layer 230G and a blue emission layer 230B respectively emitting a red light, a green light and a blue light upon excitation by a blue light provided by the backlight assembly 700. The red emission layer 230R comprises a red phosphor, and the red phosphor comprises at least one material of (Ca, Sr, Ba)S, $(Ca, Sr, Ba)_2Si_5N_8$, $CaAlSiN_3$, $CaMoO_4$ and $Eu_2Si_5N_8$. The red phosphor receives the blue light, thereby emitting and dispersing the red light.

The green emission layer 230G comprises a green phosphor, and the green phosphor comprises at least one material of yttrium aluminum garnet ("YAG"), $(Ca, Sr, Ba)_2SiO_4$, $SrGa_2S_4$, BAM, α-SiAlON, β-SiAlON, $Ca_3Sc_2Si_3O_{12}$, $Tb_3Al_5O_{12}$, $BaSiO_4$, CaAlSiON and $(Sr_{1-x}Ba_x)Si_2O_2N_2$. The green phosphor receives the blue light, thereby emitting and dispersing the green light.

The blue emission layer 230B comprises a blue phosphor, and the blue phosphor comprises at least one material of $BaMgAl_{10}O_{17}$, $BaMg_2Al_{16}O_{27}$, $Sr_{10}PO_{46}C_{12}$ and $(BaSr Ca)_{10}PO_{46}C_{12}$. The blue phosphor receives the blue light, thereby emitting and dispersing the blue light.

Also, the red, green and blue emission layers 230R, 230G and 230B may comprise quantum dots, wherein the color is selected by selecting the size of particles.

The red, green and blue emission layers 230R, 230G and 230B receive the blue light and respectively emit the red, green and blue light, however a portion of the blue light is supplied upward. The blue-light blocking filter 245 can substantially or completely block the blue light supplied upward through the red emission layer 230R and the green emission layer 230B. Also, the blue-light blocking filter 245 can substantially or completely block external light for the red emission layer 230R and the green emission layer 230B to be emitted by the external blue light.

An upper polarizer 22 is disposed on the light-blocking member 220 and the red, green and blue emission layers 230R, 230G and 230B; and a common electrode 270 is disposed on the upper polarizer 22. A liquid crystal layer 3 is disposed between the common electrode panel 200 and the thin film transistor array panel 100.

Therefore, the red, green and blue phosphors are used to form the red, green and blue emission layers 230R, 230G and 230B, respectively such that a light efficiency is improved, and the upper polarizer 22 is disposed in the liquid crystal display cell to thereby improve a cross talk.

While this disclosure describes exemplary embodiments, it is to be understood that the invention is not limited to the disclosed embodiments, but, on the contrary, is intended to cover various modifications and equivalent arrangements included within the spirit and scope of the appended claims. Thus it will be understood by those skilled in the art that various changes can be made and equivalents can be substituted for elements thereof without departing from the scope of the disclosed embodiments. In addition, many modifications can be made to adapt a particular situation or material to the teachings of this disclosure without departing from the essential scope thereof. Therefore, it is intended that this disclosure not be limited to the particular embodiment disclosed as the best mode contemplated for carrying out this disclosure.

What is claimed is:

1. A liquid crystal display comprising:
   a first substrate;
   an ultraviolet-light blocking filter disposed on the first substrate;
   a second substrate facing the first substrate;
   a liquid crystal layer, a first polarizer, and an emission layer disposed between the first substrate and the second substrate;
   a backlight assembly supplying an ultraviolet light to the first substrate and the second substrate; and
   a second polarizer disposed on a rear surface of one of the first substrate and the second substrate,
   wherein the ultraviolet-light blocking filter is interposed between the emission layer and the second substrate.

2. The liquid crystal display of claim 1, further comprising:
   a light-blocking member, a gate line, a data line, a thin film transistor, and a pixel electrode disposed on the first substrate; and
   a common electrode disposed on the second substrate.

3. The liquid crystal display of claim 2, wherein the emission layer includes a red emission layer, a green emission layer and a blue emission layer.

4. The liquid crystal display of claim 3, wherein the ultraviolet-light blocking filter includes at least one of $BiO_2$, ZnO and $Ce_2O_3$, and at least one of $CaCO_3$, $ZrO_2$, TiO and $Ar_2O_3$.

5. The liquid crystal display of claim 4, wherein the thickness of the ultraviolet-light blocking filter is between about 5 micrometers to about 20 micrometers.

6. The liquid crystal display of claim 2, wherein the emission layer includes a red emission layer, a green emission layer and a blue emission layer, and
   the red emission layer, the green emission layer and the blue emission layer comprise quantum dots.

7. The liquid crystal display of claim 6, wherein the ultraviolet-light blocking filter includes at least one of $BiO_2$, ZnO and $Ce_2O_3$, and at least one of $CaCO_3$, $ZrO_2$, TiO and $Ar_2O_3$.

8. The liquid crystal display of claim 7, wherein the thickness of the ultraviolet-light blocking filter is between about 5 micrometers to about 20 micrometers.

9. The liquid crystal display of claim 2, wherein the emission layer is disposed on the first substrate,
   the ultraviolet-light blocking filter is disposed on the emission layer,
   the first polarizer is disposed on the ultraviolet-light blocking filter,
   the gate line and the data line are disposed on the first polarizer,
   the thin film transistor electrically is connected to the gate line and the data line,
   the pixel electrode electrically is connected to the thin film transistor.

10. The liquid crystal display of claim 1, wherein the second polarizer is disposed on a rear surface of the second substrate.

11. A liquid crystal display comprising:
    a first substrate;
    a gate line and a data line disposed on the first substrate and substantially perpendicular to each other;
    a thin film transistor electrically connected to the gate line and the data line;
    a pixel electrode electrically connected to the thin film transistor;
    a second substrate disposed facing the first substrate;
    a blue-light blocking filter and a transparent polymer disposed on a surface of the second substrate and facing the first substrate;
    a light-blocking member disposed under the blue-light blocking filter and the transparent polymer;
    an emission layer disposed under the blue-light blocking filter and the transparent polymer;
    an upper polarizer disposed under the emission layer;
    a common electrode disposed under the upper polarizer; and
    a liquid crystal layer interposed between the first substrate and the second substrate.

12. The liquid crystal display of claim 11, further comprising a backlight assembly supplying light to the first substrate and the second substrate, the backlight assembly including a blue light emitting diode.

13. The liquid crystal display of claim 12, wherein the emission layer includes a red emission layer, a green emission layer and a blue emission layer,
    the red emission layer including at least one of (Ca, Sr, Ba)S, $(Ca, Sr, Ba)_2Si_5N_8$, $CaAlSiN_3$, $CaMoO_4$ and $Eu_2Si_5N_8$,
    the green emission layer including at least one of yttrium aluminum garnet, $(Ca, Sr, Ba)_2SiO_4$, $SrGa_2S_4$, BAM, α-SiAlON, β-SiAlON, $Ca_3Sc_2Si_3O_{12}$, $Tb_3Al_5O_{12}$, $BaSiO_4$, CaAlSiON and $(Sr_{1-x}Ba_x)Si_2O_2N_2$, and
    the blue emission layer including at least one of $BaMgAl_{10}O_{17}$, $BaMg_2Al_{16}O_{27}$ and $Sr_{10}PO_{46}C_{12}$, $(BaSrCa)_{10}PO_{46}C_{12}$.

14. The liquid crystal display of claim 13, wherein the blue-light blocking filter is disposed in a red pixel and a green pixel, and includes at least one of $BiO_2$, ZnO and $Ce_2O_3$, and at least one of $CaCO_3$, $ZrO_2$, TiO and $Ar_2O_3$.

15. The liquid crystal display of claim 14, wherein the thickness of the blue-light blocking filter is between about 23 micrometers to about 50 micrometers.

16. The liquid crystal display of claim 15, wherein the transparent polymer is disposed in a blue pixel.

17. The liquid crystal display of claim 12, wherein the emission layer includes a red emission layer, a green emission layer and a blue emission layer, and
    the red emission layer, the green emission layer and the blue emission layer comprise quantum dots.

18. The liquid crystal display of claim 17, wherein the blue-light blocking filter is disposed in a red pixel and a green pixel, and includes at least one of $BiO_2$, ZnO and $Ce_2O_3$, and at least one of $CaCO_3$, $ZrO_2$, TiO and $Ar_2O_3$.

19. The liquid crystal display of claim 18, wherein the thickness of the blue-light blocking filter is between about 23 micrometers to about 50 micrometers.

20. The liquid crystal display of claim 19, wherein the transparent polymer is disposed in a blue pixel.

21. The liquid crystal display of claim 11, wherein the liquid crystal layer is disposed between the first substrate and the upper polarizer.

22. The liquid crystal display of claim 11, further comprising a lower polarizer disposed on the rear surface of the first substrate.

23. A method of displaying an image on a liquid crystal display, the method comprising:
    illuminating an emission layer with ultraviolet light, the emission layer comprising a blue phosphor, a red phosphor and a green phosphor;
    emitting a blue light, a red light and a green light;
    blocking transmittance of the ultraviolet light with an ultraviolet light blocking filter; and passing the blue light, the red light and the green light through a liquid crystal layer, wherein the ultraviolet light blocking filter is interposed between the emission layer and a second substrate, and wherein the emission layer is interposed between a first substrate and the second substrate.

24. The liquid crystal display of claim 9, wherein the ultraviolet-light blocking filter is directly on the emission layer.

25. The liquid crystal display of claim 3, wherein the red emission layer including at least one of $Y_2O_2S$, $La_2O_2S$, $(Ca, Sr, Ba)_2Si_5N_8$, $CaAlSiN_3$, $(La, Eu)_2W_3O_{12}$, $(Ca, Sr, Ba)_3MgSi_2O_8$, and $Li(Eu, Sm)W_2O_8$, the green emission layer including at least one of $(Ca, Sr, Ba)_2SiO_4$, BAM, $\alpha$-SiAlON, $Ca_3Sc_2Si_3O_{12}$, $Tb_3Al_5O_{12}$ and $LiTbW_2O_8$, and the blue emission layer including at least one of $BaMgAl_{10}O_{17}$, $(Mg, Ca, Sr, Ba)_5PO_{43}Cl$, $EuSi_9Al_{19}ON_{31}$ and $La_{1-x}Ce_xAl(Si_{6-z}Al_z)(N_{10-z}O_z)$.

26. The liquid crystal display of claim 1, wherein the backlight assembly includes an ultraviolet light emitting diode.

* * * * *